UNITED STATES PATENT OFFICE.

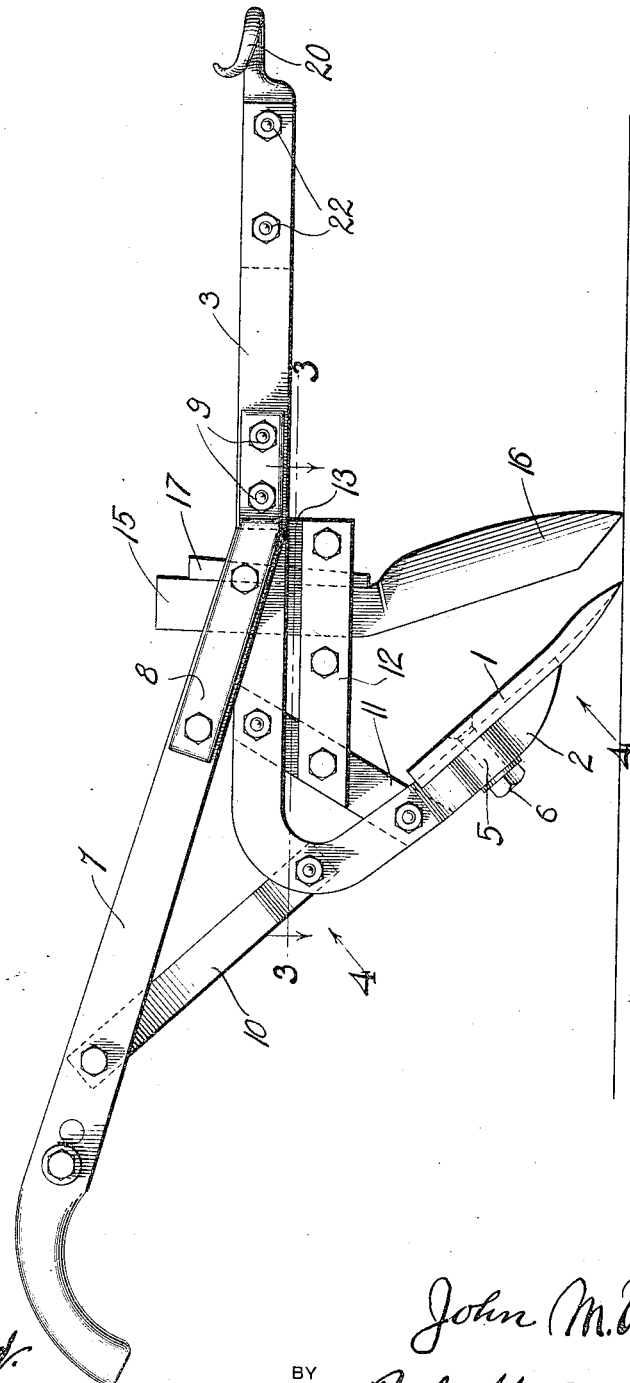

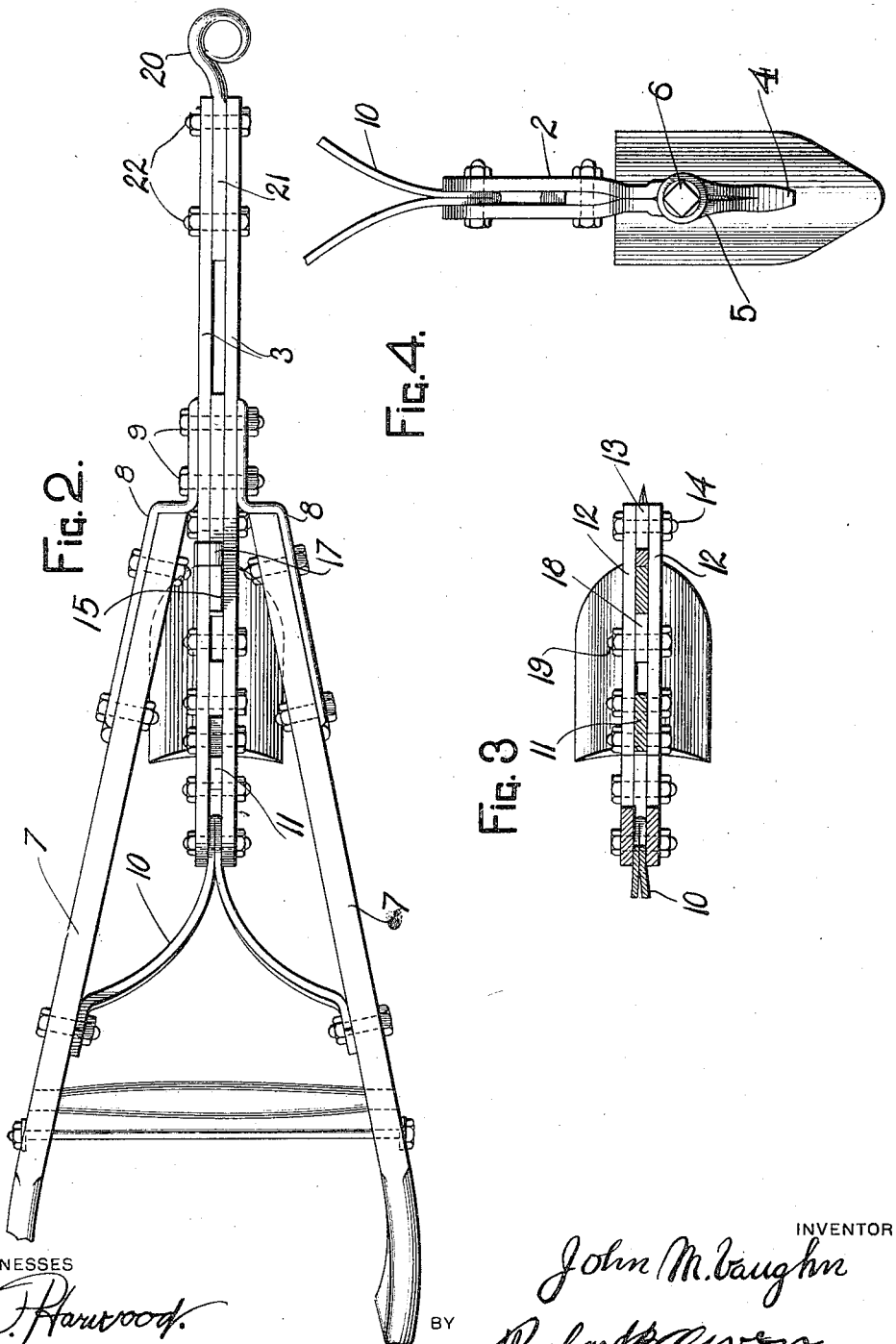

JOHN M. VAUGHN, OF INDIAN MOUND, TENNESSEE.

CULTIVATOR.

1,267,149.  Specification of Letters Patent.  Patented May 21, 1918.

Application filed March 2, 1916. Serial No. 81,699.

*To all whom it may concern:*

Be it known that I, JOHN M. VAUGHN, a citizen of the United States, residing at Indian Mound, in the county of Stewart and State of Tennessee, have invented certain new and useful Improvements in Cultivators, of which the following is a specification.

This invention has relation to cultivators and the objects and nature of the invention will be readily apparent to those skilled in the art in the light of the following explanation of the accompanying drawings illustrating what I now believe to be the preferred embodiment or mechanical expression of my invention from many other forms and arrangements within the spirit of the invention and the scope of the appended claims.

An object of the invention is the provision of a cultivator having a shovel plow and a cutting tool adapted to be placed in front of the plow for the purpose of breaking up hard soil so that the plow may further pulverize or break up the soil more readily.

Another object of the invention is to provide a cultivator of the character described in which all of its parts are made removable and adapted to be readily replaced by new parts when the machine becomes worn.

Another object of the invention is to provide a cultivator of a simple construction consistent with the functions to be performed so that it may be manufactured at a low cost.

In addition to the foregoing, my invention comprehends improvements in the details of construction and arrangement of parts to be hereinafter described and particularly pointed out in the claims.

In the drawings accompanying this specification similar and corresponding parts are designated by the same characters of reference throughout the several views in which they appear.

Figure 1, is a view in side elevation of a cultivator constructed in accordance with my invention.

Fig. 2, is a plan view thereof,

Fig. 3, is a detail horizontal section taken on line 3—3 of Fig. 1,

Fig. 4, is an under-side view of the plow and standard looking in the direction of the arrows 4—4.

In the preferred embodiment of my invention I provide a cultivator having a shovel plate 1 preferably disposed at an angle to the ground and mounted upon the down-turned portion 2 of the standard formed on the end of parallel horizontally spaced bars 3. With reference to Figs. 2 and 4 it will be noted the said bars 3 are bent upon themselves at the point 4 and are forged or otherwise pressed together at that point to form a standard 2 and providing a rounded portion 5 for the reception of a bolt 6 by which the plow is held in place.

Handle bars 7 of the usual type are provided which extend rearwardly and each secured at their forward ends to the sides of the bars 3 by means of straps 8 secured in place with bolts 9. A converging brace 10 formed of strap iron bent upon itself is disposed between the rear end of the bars 3 and the handle bars 7.

The brace bar 11 is secured at its lower end to the intermediate portion of the standard 2 and at its upper end to the beam. Bars 12 are disposed in spaced relation and underneath the bars 3 and are secured at one end to the diagonal brace 11, and at the other end to a block 13 which depends from the bars 3 and is held therebetween by means of a bolt 14.

By thus providing the bars 12, vertically alined spaces are formed by said bars and the bars 3 and extending upwardly through said spaces is a shank 15 of a cutting blade or tool 16 arranged to precede the action of the shovel and to be disposed centrally in alinement. A wedge 17 is adapted to be inserted in the aforesaid vertically alined spaces for the purpose of adjustably securing the shank and the tool 16 by wedging between the block 13, and an abutment 18 held in the space between the bars 3 by a bolt 19. A clevis 20 is provided which is formed with a rearwardly extending portion 21 which is secured between the forward ends of the bars 3 by means of bolts 22.

From the foregoing it will be obvious to persons engaged in agricultural pursuits that I have provided an extremely efficient cultivator which is rendered particularly advantageous by the provision of the cutting tool 16. It will be further apparent, that the principles of construction embodied in my invention as illustrated in the accompanying drawings enable me to provide a cultivator whose parts are simple in their formation and readily replaceable when desired.

While I have described the construction of my invention with some degree of particularity I wish it understood that I desire to reserve the privilege to change the forms of the details or otherwise arrange the parts without departing from the spirit of the invention or the scope of the claims.

Having thus described my invention what I claim is:—

1. The combination in a cultivator including a beam formed of spaced bars, spaced bars disposed beneath the plow beam thereby defining vertical alined spaces, a cutting tool provided with a shank and having said shank extended into the spaces, and means for securing said shank in place.

2. The combination in a cultivator having a plow beam formed of spaced bars, of horizontally spaced bars disposed beneath the plow beam thereby defining vertically alined spaces, an abutment block secured at one end between the said horizontal bars and the bars of the plow beam, a second abutment block disposed between the horizontal bars and at an intermediate portion thereof, said abutment blocks being horizontally spaced, a ground engaging cutting tool provided with a shank which is adapted to be inserted into the spaces between the abutment blocks and the spaces in the plow beam, and a wedge adapted to engage the shank and one of the abutment blocks.

3. A cultivator comprising a beam formed of horizontally spaced bars, the rear ends of which are bent forwardly at an angle to the beam to form a standard, a diagonal brace bar connected at its ends to the beam and standard, horizontally spaced bars secured at one end of the brace and having their forward ends secured to a block depending from the plow beam, an abutment block secured between the horizontal bars, a ground engaging tool having a shank, said shank being adapted to be inserted into the spaces between the abutment and the block at the forward end of the horizontal bars, and a wedge adapted to engage the shank and one of the abutment blocks.

In testimony whereof I affix my signature in presence of two witnesses.

JOHN M. VAUGHN.

Witnesses:
T. H. MANN,
C. W. BLANE.

Copies of this patent may be obtained for five cents each, by addressing the "Commissioner of Patents, Washington, D. C."